Nov. 22, 1966 — H. WECHSLER ETAL — 3,287,480
PELLETIZING PLASTICS
Filed March 31, 1964

INVENTORS
HARRY WECHSLER
MILTON W. KLINE
BY
ROBERT CALVERT
ATTORNEY.

United States Patent Office 3,287,480
Patented Nov. 22, 1966

3,287,480
PELLETIZING PLASTICS
Harry Wechsler and Milton W. Kline, both of Leominster, Mass., assignors to The Borden Company, a corporation of New Jersey
Filed Mar. 31, 1964, Ser. No. 356,123
7 Claims. (Cl. 264—122)

This invention relates to a process of compounding a resin and plasticizer. It is particularly useful in connection with decreasing the time required in the final or fluxing step of making plasticized vinyl resin compositions and will be illustrated in connection with such use.

In this art it is customary first to mix the resin in the powdered or subdivided form with the selected plasticizer in proportion to modify the properties as desired in the final composition. The compounding is concluded by heating the mixed materials to the temperature of fluxing and continuing the heating until the mass is fully compounded, that is, made substantially uniform.

We can now decrease by a fifth or more the time required in this final fluxing.

Briefly stated, the invention comprises the herein described process of pressing together and forming the mixed resin and plasticizer, while still under compression, into shape-retaining masses which we call pellets. The thus formed pellets are heated by the user of them to an elevated temperature of fluxing of the mixture. In the preferred embodiment, the invention includes incorporating, into the mixture to be formed into pellets, a conventional stabilizer against decomposition of the selected resin by heat or light and suitably also a lubricant to promote workability or parting of the mass from the surfaces of the equipment during the processing. In any event, all materials that are to be in the finished plastic are admixed in advance of the pelletizing operation.

A form of equipment used in pelletizing is shown in the drawings.

Figure 1:
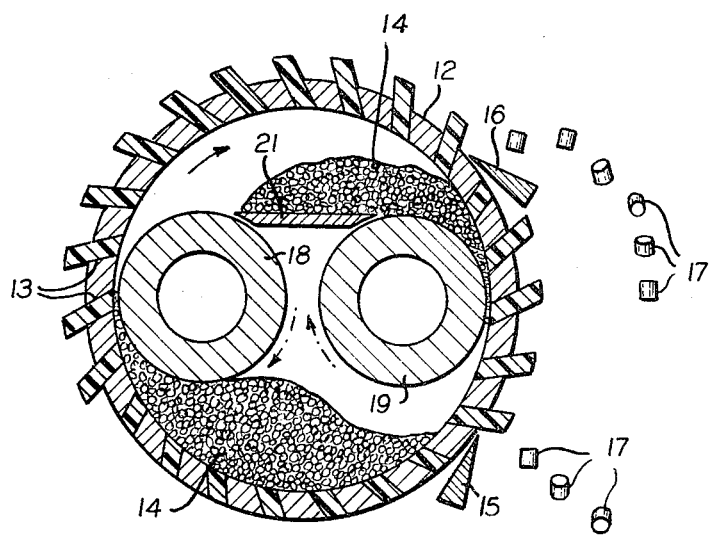
FIG. 1 is a cross section showing the pelletizing machine in operation.
Figure 2:
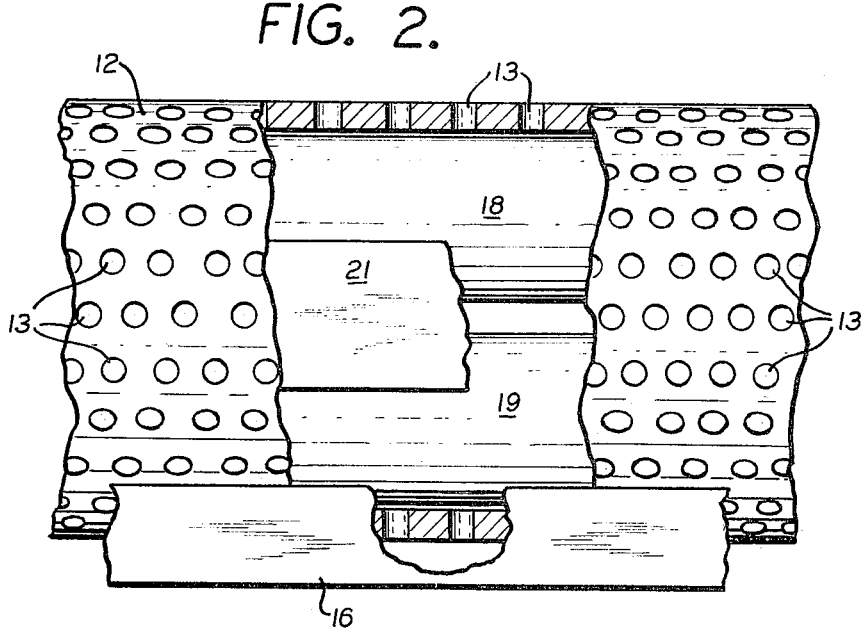
FIG. 2 is a longitudinal view thereof.

Supports, drives, and other necessary accessories and parts that are not shown are conventional in machines of this type, an example of a machine that we can use being illustrated by the California Pellet Mill Co., in Engineering Catalog for 1963, page 1270.

There are shown a driven cylindrical die 12 provided with holes 13 through which the compressed and shaped mass of the premixed composition 14 is forced and then passed against the cutoff knives 15 and 16 for severing the extruded material into slugs or pellets 17 of relatively short length.

The rollers 18 and 19 are mounted rotatably, each on an axis (not shown) that maintains said rollers throughout their lengths adjacent to the inner surface of the cylinder 12, so that driving of the cylinder causes rotation also of said rollers, all in the direction of the arrows.

As to materials, we obtain the most satisfactory results when the resin used is largely or wholly polyvinyl chloride, either alone or in the form of a copolymer of vinyl chloride with an ethenoid comonomer, e.g., the $C_{1-8}$ alkyl acrylates and methacrylates, $C_{6-10}$ aryl acrylates and methacrylates, and vinyl esters of $C_{2-6}$ aliphatic acids. Examples of such comonomers that we can use are methyl, ethyl, butyl and octyl acrylate and methacrylate; phenyl and alkyl-substituted-phenyl acrylates and methacrylates, the alkyl component of the substituted aryl group containing 1–4 carbon atoms making the total carbons in the aryl or substituted aryl esters about 6–10; and vinyl acetate, butyrate, and hexoate.

The copolymers contain ordinarily about 5–20 parts of said comonomer for 100 parts of vinyl chloride, but the proportion of the comonomer may be increased as up to 50 parts.

As the plasticizer we use a liquid solvent (for the resin) that is substantially non-volatile, i.e., at ordinary temperatures. Examples of suitable plasticizers are dibutyl, dioctyl, dinonyl and other di-$C_{2-10}$ alkyl phthalates; tricresyl phosphate; glycerol, ethylene glycol, or diethylene glycol citrate, adipate, or sebacate, the esters being tri- in the case of glycerol and di- for the glycols; and any alkyl or alkaryl phthalates having a total of about 15–25 carbon atoms per mole.

Other additives of usual kind may be incorporated in usual amount for their customary effects.

These would include admixed stabilizers for the resin, there may be used the barium and cadmium salts of any $C_{12}$–$C_{18}$ fatty acid, e.g., lauric, oleic, or stearic, triphenyl phosphite, epoxidized soybean oil or like oil containing, for instance, about 1 epoxy group per mole of the triglyceride; and mixtures of one or more of these stabilizers with each other.

Lubricants that may be used in the mixture being compressed and shaped into pellets are again those that are usual for the particular resin selected. Examples are calcium stearate, stearic acid, carnauba wax, and other vegetable and mineral waxes conventionally used as parting agents in plastic compositions.

Other additives that may be added include finely divided fillers, such as clay, lampblack, and wood flour, and pigments to establish a desired color, e.g., titanium dioxide, carbon black, calcium carbonate, talc, iron oxide, etc.

The following table shows proportions that are permissible and those that are recommended for commercial operations, all proportions being expressed as parts by weight, here and elsewhere herein, unless specifically stated to the contrary.

| Components | Parts by Weight Permissible | Recommended |
|---|---|---|
| Resin | 100 | 100 |
| Plasticizer | 5–60 | 20–50 |
| Stabilizer | 0–10 | 1–5 |
| Lubricant | 0–2 | 0.1–0.5 |

Stabilizer must be used, as in the amount of at least about 0.1% if the finished product is to be exposed to heat or light.

As to conditions, the pressure of consolidating the mixed resin and plasticizer, either with or without additional minor components, is made sufficient to give an overall bulk density, as measured by weighing unit volume of a large number of random packed pellets, that is at least a fifth greater than for the mixture as originally introduced into the pelletizing machine. Pressures that are representative are 100–5,000 p.s.i., recommended pressures being about 200–2,000 p.s.i.

The degrees of compression and elevation of temperature are mutually dependent. They are sufficiently high to cause incipient fusion as shown by adherence of contacting particles of the mixture into masses that, when cut into pellets, such as ¼ to ½ inch diameter and length can be handled to the final fluxing step with at least a major proportion, e.g., 90% of them not falling to a powder. While the temperature should be at least as high as to cause incipient fusion of the resin in contact with the plasticizer, it is kept below that of fluidizing the entire mass. Thus suitable temperatures are about 130°–250° F., the exact temperature to be used being higher, the less active as a solvent is the plasticizer used or the lower its proportion. When dioctyl phthalate is the plasticizer and its proportion is 25% of the weight of the resin, suitable temperatures of pelletizing are about 150°–200° F. The exact temperature to be used will also depend on the molecular weight of the resin used, being higher the higher the molecular weight. The compressing and pelletizing is conducted ordinarily without exterior warming, the friction and pressure resulting from the pelletizing machine causing the desired warming of the materials.

The period of the compression is very short. It covers substantially only the time of dwell of the material in the nip between one of the 18 or 19 rollers, and the perforated cylinder, 12. This is estimated as being of the order of only a few seconds or less.

In the final fluxing of the materials that have been previously pelletized, we use equipment and temperatures that are usual for that step, as for example, hot roller mills operating at stock temperature of about 270° F. or above and normally between about 270° and 375° F. We vary from the conventional practice only in that we do not need or use as long a time of heating as was required with the unpelletized and uncompressed mixture.

The invention will be further illustrated by description in connection with the following specific examples of the practice of it.

Example 1

The following mixture was blended by tumbling the following dry 100 parts ingredients for one hour in a steam heated ribbon blender; polyvinyl chloride resin, of particle size about 110 microns with 90% of the material retained on a U.S. standard 140 mesh sieve; 45 parts of dioctyl phthalate; 5 parts of mixed calcium and zinc laurate as stabilizer; 5 parts of epoxidized soy oil as additional plasticizer and stabilizer; and .05 part of calcium stearate as lubricant.

The dry blend premix so obtained, of an overall bulk density of 20 pounds per cu. ft., was divided into two portions, A and B.

Portion A was used directly in the test described below.

Portion B was compacted by passage under the conditions described through a pellet mill constructed in the manner illustrated in the drawing, to give pellets in the form of rough rods of average particle size about 3/16 x 1/4 inch and bulk density 27 pounds per cu. ft.

The premix A and compacted pellets B were then tested for the speed with which they "made up," i.e., fluxed in a plastograph which is an apparatus having mixing rolls similar to those found in a roll mill. The rolls were run at 31.5 r.p.m. at two different temperatures, with the following results.

| Temp., °F. | Make-up Time, minutes | | Decrease in time Between A and B |
|---|---|---|---|
| | Dry Blend A | Compact B | |
| 300 | 18.0 | 14.0 | 22% |
| 325 | 7.0 | 5.5 | 21% |

The decrease in make-up time by using the compacted mixture instead of the dry blend represents a significant potential increase in plant capacity and decreased cost in the fluxing step.

Variations of this example are made separately, as follows:

(a) The proportions of the several components are varied within the permissible range, supra, for each.

(b) The polyvinyl chloride is replaced by any of the copolymers listed above.

(c) The plasticizer components are replaced by 50 parts of any plasticizer listed above or mixtures thereof.

(d) The stabilizer and lubricant are replaced, respectively, by 2 parts of any stabilizer and 0.1 part of any lubricant described above.

It will be understood that it is intended to cover all changes and modifications of the examples of the invention herein chosen for the purpose of illustration which do not constitute departures from the spirit and scope of the invention.

We claim:
1. In compounding a powdered resin selected from a group consisting of polyvinyl chloride and copolymers of vinyl chloride and an ethenoid comonomer with a chemically inert, substantially non-volatile liquid solvent serving as a plasticizer for the resin, the process which comprises:
  (1) forming a mixture, in dry form, of about 100 parts of said resin and 5–60 parts of the plasticizer,
  (2) compressing said mixture, at a temperature of incipient fusion of said resin in contact with said plasticizer, into shape-retaining pellets that have an overall bulk density at least about 1/3 higher than said mixture before said compression, and
  (3) heating said pellets at a temperature of fluxing until the resulting mass is substantially uniform.

2. The process of claim 1, said resin being polyvinyl chloride.

3. The process of claim 1, said resin being a copolymer of polyvinyl chloride with a $C_{1-8}$ alkyl acrylate.

4. The process of claim 1, said resin being the copolymer of 100 parts of vinyl chloride with about 5–20 parts of ethyl acrylate.

5. The process of claim 1, said resin being a copolymer of polyvinyl chloride with vinyl acetate.

6. The process of claim 1, the temperature of said incipient fusing being about 130°–250° F.

7. In compounding polyvinyl chloride resin with dioctylphthalate as plasticizer for the resin, the process which comprises:
  (1) forming a mixture of said resin and plasticizer,
  (2) compressing said mixture at a temperature at which the particles thereof become adherent into shape-retaining pellets that have an overall bulk density at least about 1/3 higher than said mixture before said compression, said temperature being in the range of between about 130°–250° F. and
  (3) heating said pellets at a temperature of fluxing, said temperature being in the range of between about 270°–375° F. until the resulting mass is substantially uniform.

References Cited by the Examiner

UNITED STATES PATENTS 2,567,274   9/1951   Colombo.
3,004,294   10/1961   Richard et al. _____ 264—126

ROBERT F. WHITE, *Primary Examiner.*

F. S. WHISENHUNT, J. R. HALL, *Assistant Examiners.*